United States Patent [19]
Choi

[11] Patent Number: 6,009,526
[45] Date of Patent: Dec. 28, 1999

[54] INFORMATION SECURITY SYSTEM FOR TRACING THE INFORMATION OUTFLOW AND A METHOD FOR TRACING THE SAME

[76] Inventor: Seung-ryeol Choi, 512-1103, Kangchon Maeul, 789, Madoo-dong, Ilsan-gu, Koyang, Kyonggi-do, Rep. of Korea

[21] Appl. No.: 08/928,859

[22] Filed: Sep. 12, 1997

[30] Foreign Application Priority Data

Sep. 24, 1996 [KR] Rep. of Korea ............. 96/42118

[51] Int. Cl.$^6$ ................................................. G06F 12/14
[52] U.S. Cl. ................................. 713/200; 713/201
[58] Field of Search ........................ 395/186, 187.01, 395/188.01, 184.01, 200.3, 200.33, 200.48, 200.51, 200.54, 200.57; 380/21, 23, 25, 4, 49; 713/200, 201, 202

[56] References Cited

U.S. PATENT DOCUMENTS

| | | | |
|---|---|---|---|
| 4,881,179 | 11/1989 | Vincent | 364/518 |
| 4,926,476 | 5/1990 | Covey | 380/4 |
| 5,335,276 | 8/1994 | Thompson et al. | 380/21 |
| 5,414,844 | 5/1995 | Wang | 395/650 |
| 5,602,916 | 2/1997 | Grube et al. | 380/21 |
| 5,652,795 | 7/1997 | Dillon et al. | 380/25 |
| 5,671,285 | 9/1997 | Newman | 380/30 |
| 5,692,124 | 11/1997 | Holden et al. | 395/187.01 |
| 5,859,968 | 1/1999 | Brown et al. | 395/186 |

*Primary Examiner*—Ly V. Hua
*Attorney, Agent, or Firm*—Dann, Dorfman, Herrell and Skillman, P.C.

[57] ABSTRACT

An information security system for tracing information outflow from a remotely accessible computer or computer network is disclosed. The system includes an internal communication system that has at least one internal computer for transmitting security information by tracing data through communication equipment, outputting the data to an external output means, and connecting the internal computer to an external network. A communication monitoring device stores information regarding the data that is to be transmitted by applying a security policy according to a security grade assigned to the destination to which the data is to be transmitted. The communication monitoring device is configured for extracting the identification of the destination from the transmitted data. It also includes a communication monitoring server for storing and displaying predetermined information about the data to be transmitted and for determining whether the tracing information is stored according to the security grade for the identified destination. A method of operating the disclosed system is also described.

20 Claims, 9 Drawing Sheets

FIG. 2

| | A | B | C |
|---|---|---|---|
| Internal computer 1 | Information transmission | information transmission<br>Tracing operation | False information transmission<br>Transmission pause<br>Tracing operation |
| ⋮ | ⋮ | ⋮ | ⋮ |
| Internal computer n | Information transmission | information transmission<br>Tracing operation | False information transmission<br>Transmission pause<br>Tracing operation |

INFORMATION SECURITY SYSTEM FOR TRACING THE INFORMATION OUTFLOW AND A METHOD FOR TRACING THE SAME

BACKGROUND OF THE INVENTION

1. Field of the Invention

The present invention relates to an information security system and a method thereof, and particularly to an information security system for tracing the information outflow and a method for tracing the same in order to prevent the information of an organization from being flown out.

2. Description of the Related Art

Nowadays, with the development of the communication technologies and the wide spread of computers, data which had been manually handled can be processed by computers and data which had been manually transmitted by a person are transmitted by the computer communications. As the communication technologies have been developed and the data have been transmitted via the computer communications, the efficiency of the work can be enhanced. Moreover, with the appearance of a distributed system based on the computer communication, the efficiency is doubled.

Accordingly, each organization establishes various kinds of the distributed system. Out of the structures of the distributed system, a client-server model using an internal network is most typical.

The client-server model is composed of: a file server which shares a large quantity of files; device servers, i.e., a printer server, a plotter server and a modem server which share devices such as a printer; client computers which use the servers; and an internal network, i.e., a local area network (LAN) which interconnects the aforesaid servers and computers.

FIG. 1 is a conventional internal communication system composed of a plurality of computers and servers.

As shown in the drawing, the system includes: a file server 11 for storing an operation data of an organization; a printer server 12 for processing a printing command after receiving the command from an internal computer; a local area network (LAN) 13 for a data communication inside of the organization; and internal computers 14 for accessing to the data stored in the file server 11 and requesting a printing operation to the printer server 12. Here, the LAN 13 is connected to an external network and can perform a data communication with the computers connected to the external network.

As the operation of the internal communication system of the client-server model having the above-identified structure is conventional to the skilled in this art, the detailed description will be omitted.

The increase of the data processing using the computers in the organization and the increase of the computer communications which transmit data using the communication equipment can cause the information to be flown out to a competing organization.

Conventionally, the method for flowing out the data from the organization includes: an outflow by a storage medium such as a diskette, tape, etc.; an outflow by an output medium such as printing paper; and an outflow by a communication medium.

The data outflow by the conventional communication media is classified into the outflow through an Internet when the internal network is connected to the Internet through the dedicate communication line and the outflow by a public network through a modem attached to the computer.

Until now, the conventional information security system has mainly been directed to the network information security system for securing the internal system by preventing a thing which is harmful to the internal system such as a hacker from approaching to the internal network corresponding to the source of the data through a firewall.

Accordingly, there are no defensive measures for the data outflow by the storage media, output media and the communication media.

The network information security system in the internal network connected to the Internet can restrict the data outflow using a destination to which data is transmitted. However, as this method applies a role of the firewall that all data which are not allowed cannot be transmitted/received, the transmission of selective data according to the security grade of the destination cannot be performed. In results, the efficiency of the data communication system is decreased due to the restriction of the unnecessary data transmission.

As described above, the important data stored in the file server of the internal communication system can easily be accessed by persons who have undesirable motive and easily be flown out to the competing organization through the output device.

SUMMARY OF THE INVENTION

Therefore, it is an object of the present invention to trace a data outflow in an organization to a destination where a security grade is a competitive group or a cooperative group, through a communication equipment.

It is another object of the present invention to reduce a burden of tracing operation by not performing the tracing operation when the data of the organization is transmitted to the destination where the security grade is a same group, through the communication equipment, thereby increasing the efficiency of the data communication system.

It is another object of the present invention to prevent data from being flown out through storage media and output media, by tracing all the output operation such as a storing or printing operation of data performed by computers inside of the organization.

It is another object of the present invention to prevent data from being flown out caused by the unlawful reconfiguration of hardware.

According to one aspect of the present intention to achieve the abovementioned objects, an information security system for tracing the information outflow, includes: an internal communication system which has internal computers for informing the security information by sensing a data communication through a communication equipment, output of data to a predetermined external output unit and reconfiguration of the hardware, and connects the internal computers to a predetermined external network; and a communication monitoring device which stores a predetermined information regarding the data to be transmitted by applying the established security policy according to a security grade of a destination to which the data is transmitted by the internal computers. The communication monitoring device, includes: a destination extracting unit for extracting the destination from the data to be transmitted; and a communication monitoring server for storing and displaying the predetermined information about the data to be transmitted and the security information by determining whether the tracing information is stored and data to be transmitted exist according to the security grade for the extracted transmission destination.

Preferably, the predetermined external network is a public switched telephone network (PSTN).

Preferably, the destination extracting unit is a switch for connecting the internal computers to the (PSTN).

Preferably, the predetermined external network is an Internet.

Preferably, the destination extracting unit is a packet filtering gateway for connecting the internal computers to the Internet.

Preferably, the security grade is classified into a same group; a cooperative group; and a competitive group according to the characteristic of the destination to which the data to be transmitted.

Preferably, according to the security policy, data is transmitted to the destination, when the security grade is the same group; the predetermined information regarding the data to be transmitted is stored/displayed in/on the communication monitoring server, when the security grade is the cooperative group; and the predetermined information regarding the data to be transmitted is stored/displayed in/on the communication monitoring server and the false information is created and transmitted to the destination, when the security grade is the competitive group.

Preferably, the predetermined information includes a time when the information is flown out; details about a person who flows out the information; a destination to which the information is flown; and a name of a file which is to be flown out.

Preferably, the predetermined external output unit is an external storage unit equipped with a portable storage medium.

Preferably, the external storage unit is a floppy disk drive.

Preferably, the predetermined external output unit is an output unit which outputs data using a printable medium.

Preferably, the output unit is a printer.

According to another aspect of the present invention, an information security method for tracing the information outflow in the security system having a monitoring server for connecting internal computers connected to an internal network to an external network, includes the steps of: storing the information about a changed hardware by sensing the change of the hardware of the internal computer; transmitting the stored information about the changed hardware to the monitoring server, in the case that the communication is established between the internal computer and the monitoring server; storing the information about an output operation, when the communication is not established between the internal computer and the monitoring server and the output operation, i.e., the information outflow is generated from the internal computer; determining whether the information outflow operation is generated in the internal computer, after transmitting the changed information to the monitoring server; detecting the destination to which the data is transmitted, when the information outflow operation is performed by a communication unit; acquiring a security grade corresponding to the detected destination; transmitting data according to the acquired security grade; and transmitting data on the information outflow to the monitoring server, when the information outflow operation is performed by the predetermined external output unit.

Preferably, the security grade is classified into a same group; a cooperative group; and a competitive group according to the characteristic of the destination to which the data is transmitted.

Preferably, the step of storing the output information, includes the steps of: determining whether the information output operation is generated from the internal computer; detecting the destination to which the data is transmitted, when the information output operation is performed by a predetermined communication unit; acquiring the security grade corresponding to the detected destination; transmitting the data to the destination to which the data is to be transmitted, when the acquired security grade is the same group; transmitting the data to the destination after storing/displaying the predetermined information about the data to be transmitted in/on the monitoring server, when the acquired security grade is the cooperative group; transmitting the data to the destination by creating the false information after storing/displaying the predetermined information about the data to be transmitted in/on the monitoring server, when the acquired security grade is the competitive group; and storing the information about the information output operation in the internal computer, when the information output operation is performed by the predetermined external output unit.

Preferably, the step of transmitting data, includes the steps of: transmitting the data to the destination to which the data is transmitted, when the acquired security grade is the same group; transmitting the data to the destination after storing/displaying the predetermined information about the data to be transmitted in/on the monitoring server, when the acquired security grade is the cooperative group; and transmitting the data to the destination by creating the false information after storing/displaying the predetermined information about the data to be transmitted in/on the monitoring server, when the acquired security grade is the competitive group.

Preferably, the predetermined information includes: a time when the information is flown out; details about a person who flows out the information; a destination to which the information is flown; and a name of a file which is to be flown out.

Preferably, the predetermined communication unit is a modem.

Preferably, the predetermined external output unit is an external storage unit equipped with a portable storage medium.

Preferably, the external storage unit is a floppy disk drive.

Preferably, the predetermined external output unit is an output unit which outputs data using a printable medium.

Preferably, the output unit is a printer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2 is a table of a transmission control matrix indicating the transmission control according to a security grade of the destination to which the data is transmitted, in accordance with the present invention;

DETAILED DESCRIPTION OF THE PREFERRED EMBODIMENTS

Figure 1:
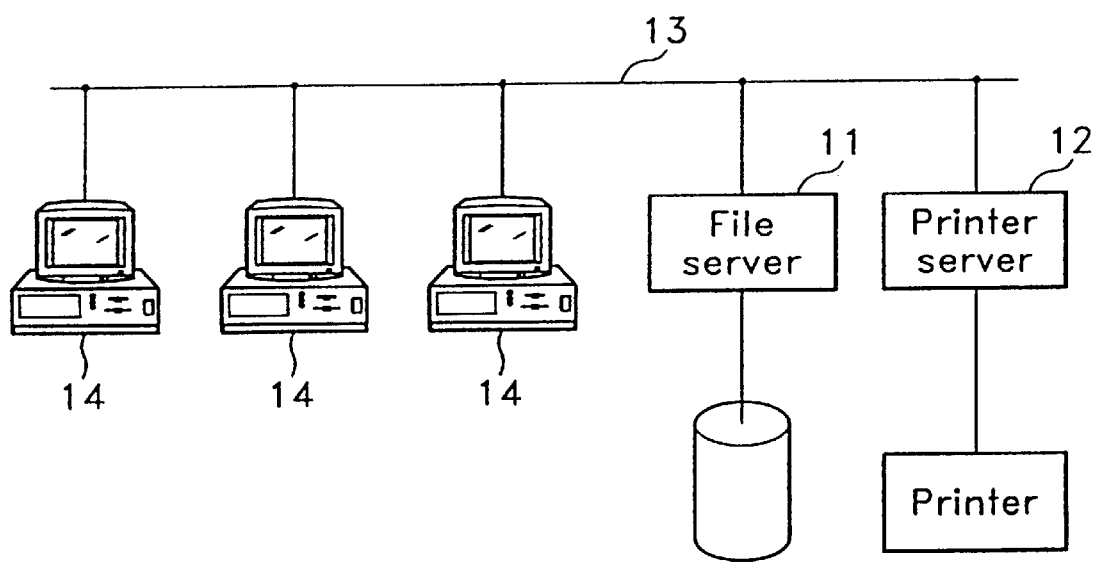
FIG. 1 is an internal communication system composed of a plurality of computers and servers.

The objects, characteristics and advantages of the above-described invention will be more clearly understood through the preferable embodiments referring to the attached drawings.

As the terms mentioned later are determined based upon the function of the present invention and they can be changed according to the technician's intention or a usual practice, the terms should be determined considering the overall contents of the specification of the present invention.

In the specification, the term, information, is indicated as a data or a file. When and object to be processed are described from the aspect of the security, it is indicated as the information, and it is indicated as data in the case that the object to be processed is a conventional one. Moreover, as a unit for managing the information and data, a file is indicated. In results, those three terms can be regarded similarly.

FIG. 2 is a transmission control matrix illustrating the transmission control according to the security grade of the destination to which data is transmitted.

As illustrated in the drawing, internal computers connected to an internal network perform an operation according to the security grade of the destination to which the data is transmitted. The security grade is classified into a same group A which is performing operation in a same organization; a cooperative group B which is performing a cooperative operation though it is not the same organization; and a competitive group C which is in a competitive relation to the organization.

Figure 3:
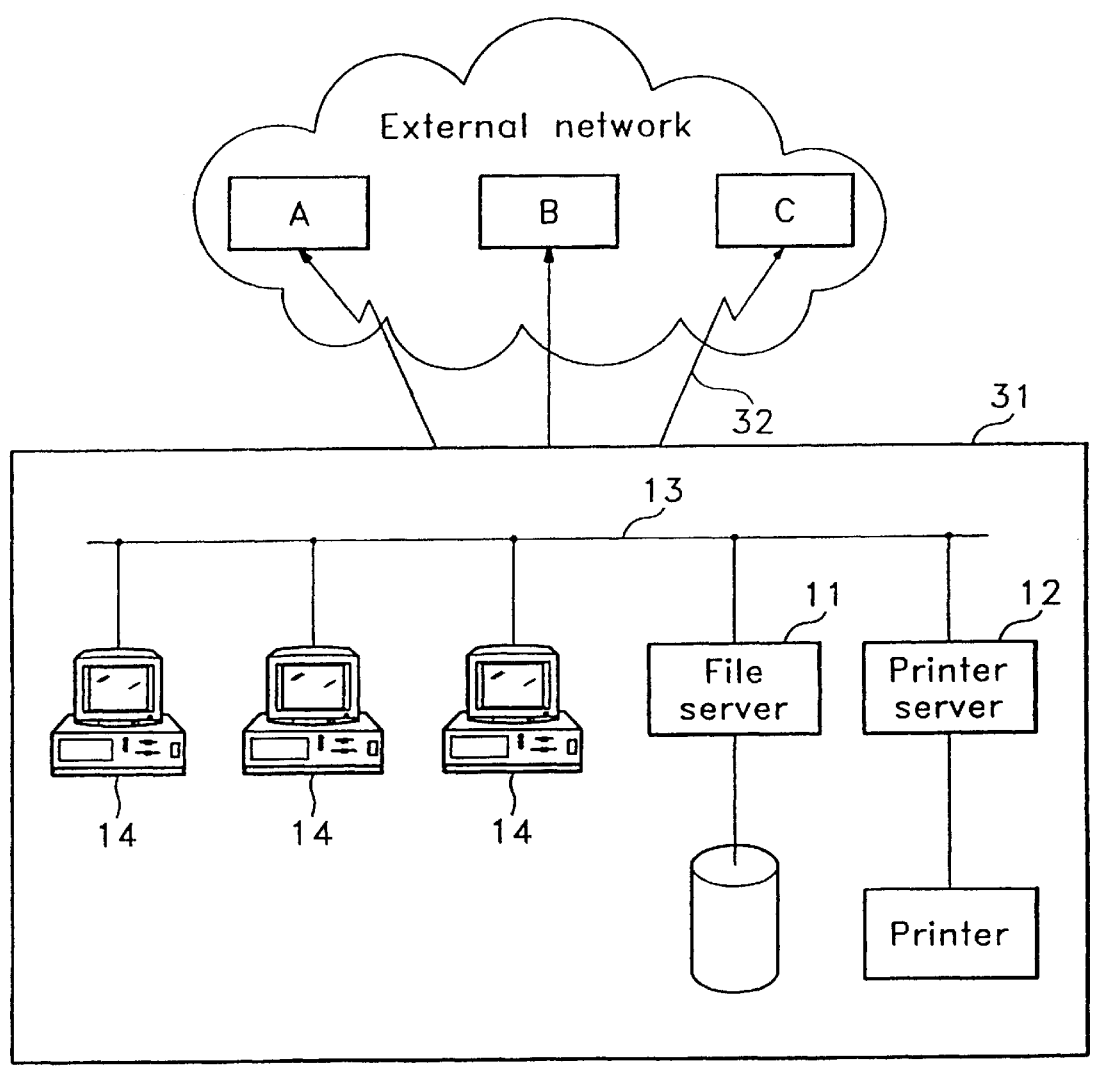
FIG. 3 is a conceptive diagram indicating the data transmission according to the security grade of the destination to which the data is transmitted, in accordance with the present invention.

FIG. 3 is a conceptive diagram illustrating the data transmission according to the security grade of the destination to which the data is transmitted, in accordance with the present invention.

As illustrated in the drawing, the internal computers 14 of an internal communication system 31 can communicate with the destination through a communication link 32, according to the security grade of the destination, and the communication is controlled by a control policy such as the transmission control matrix shown in FIG. 2. At this time, the data communication link 32 can be actualized by several suitable communication methods.

As will be illustrated in the embodiment, the internal computer 14 can perform the data communication with a public switched telephone network (PSTN) through a modem, and with an Internet through a dedicate communication adapter for connecting the Internet.

Figure 4:
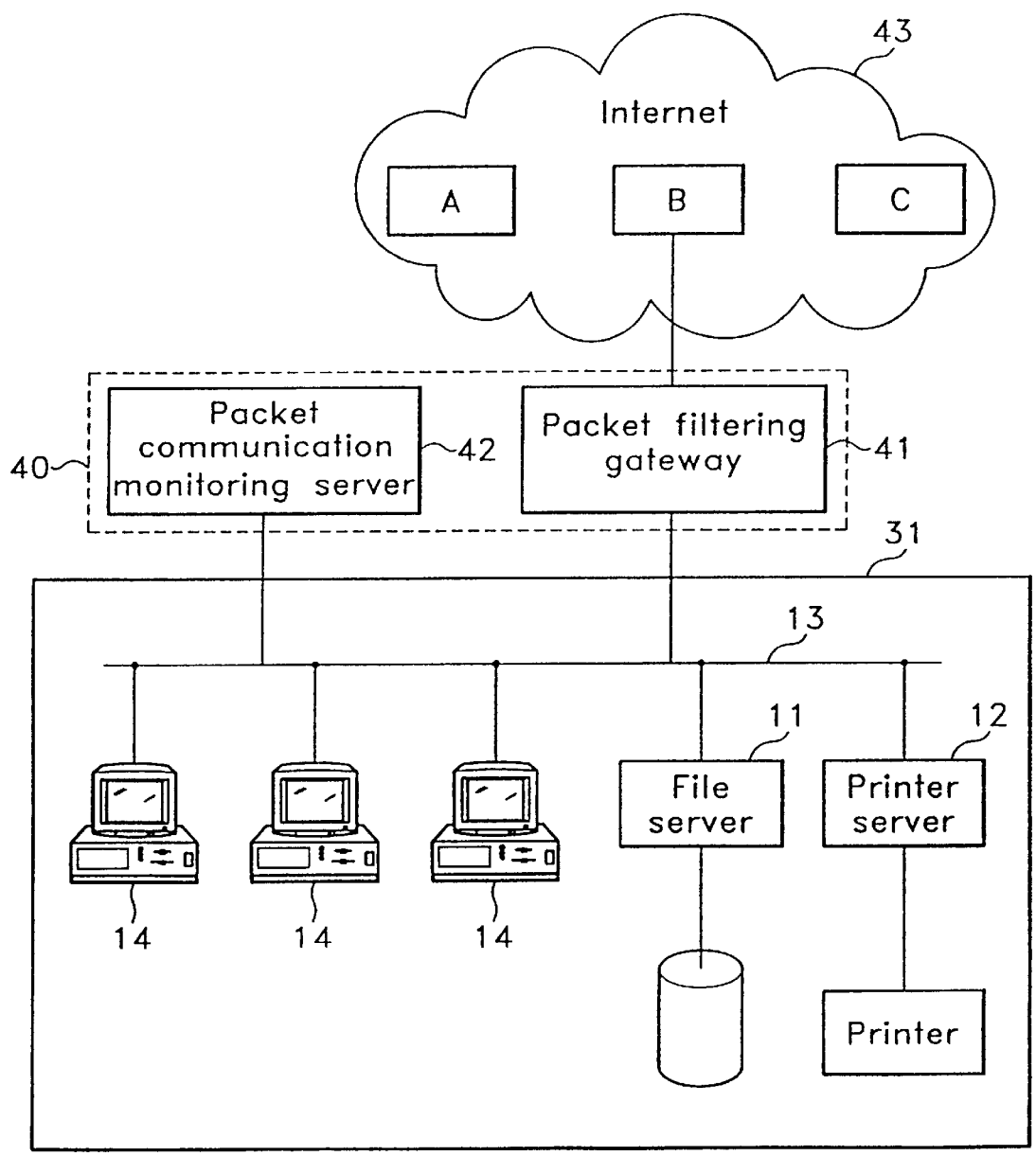
FIG. 4 is a first embodiment of the present invention illustrating an information security system for tracing the information outflow when communicating data through an Internet.

FIG. 4 is a first embodiment of the present invention, and it indicates the information security system for tracing the information outflow when communicating the data through the Internet.

As shown in the drawing, the information security system, includes: the inter communication system 31 having internal computers 14 for informing the security information by sensing the data communication through the dedicate communication adapter for Internet, data output through an external output unit such as a printer or an external storage drive and reconfiguration of a hardware by users, and connecting the internal computers to the Internet 43; a packet communication monitoring device 40 for storing the information about the data to be transmitted by applying the established security policy according to the security grade of the destination to which the data is transmitted by the internal computer 14.

Here, the packet communication monitoring device 40 is composed of: a packet filtering gateway 41 for extracting the destination from the data transmitted in form of a packet; and a packet communication monitoring server 42 for storing/managing the information about the data to be transmitted and on the unlawful hardware reconfiguration transmitted from the internal computer 14, after determining whether the traced information is stored and the data to be transmitted is transmitted according to the security grade corresponding to the extracted destination.

Figure 5:
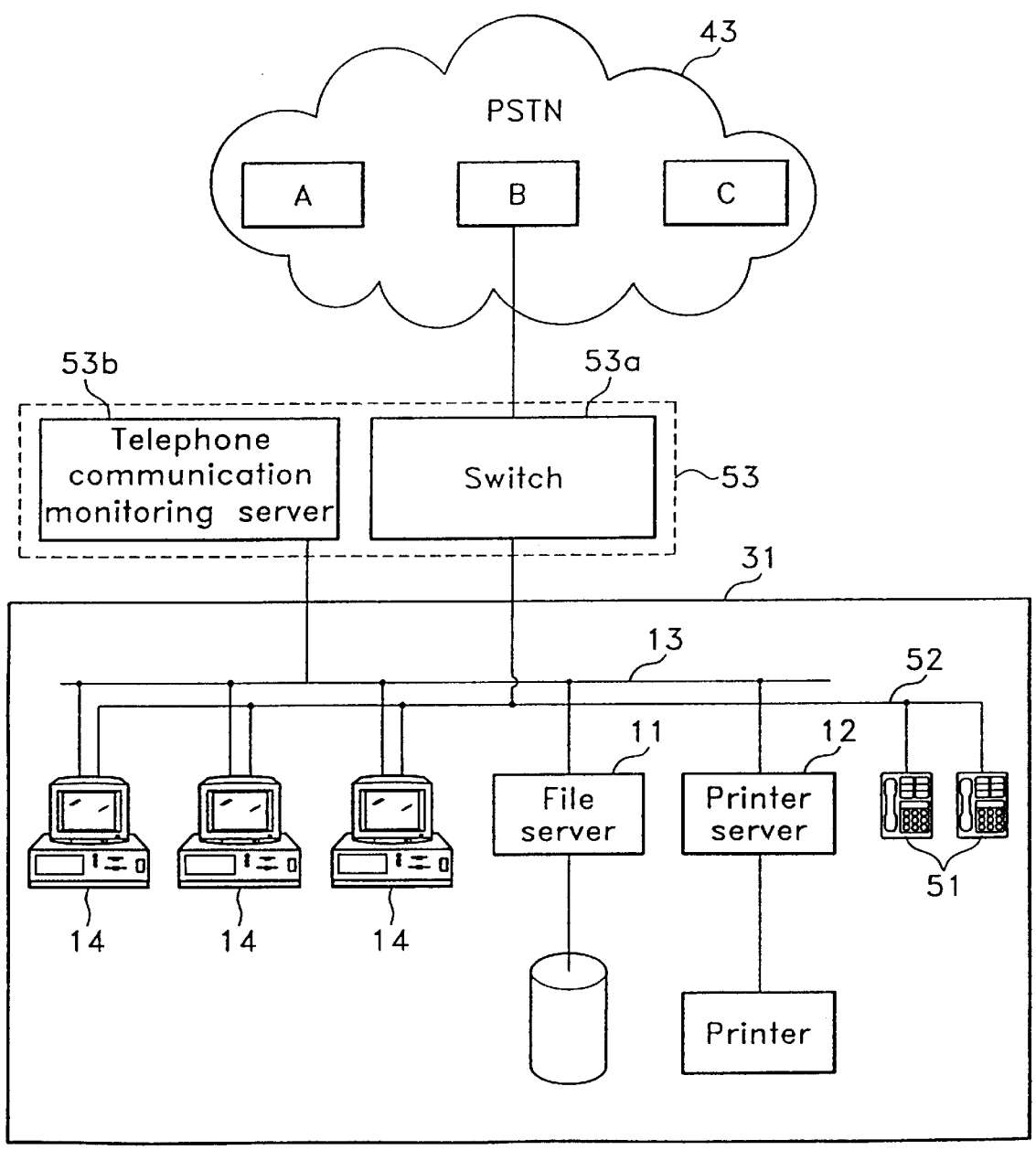
FIG. 5 is a second embodiment of the present invention illustrating an information security system for tracing the information outflow when communicating data through a public switched telephone network (PSTN)

FIG. 5 is a second embodiment of the present invention, and it shows the information security system for tracing the information outflow when communicating the data through the PSTN.

As illustrated in the drawing, the information security system, includes: the internal communication system 31 which has internal computers 14 for informing the security information by sensing the data communication using the modem, data output through the external output unit such as the printer and external storage drive and the reconfiguration of the hardware by users, and has a telephone line 52 for telephone call through a telephone 51 and modem communication of the internal computer 14, for connecting the internal computers 14 to the PSTN 54; a telephone communication monitoring device 53 for storing the information about the transmitted data by applying the established security policy, according to the security grade of the destination to which the data is transmitted via the modem of the internal computer 14.

The telephone communication monitoring device 53, includes: a switch 53a for extracting the destination when the internal computer 14 establishes the destination and the channel for the telephone call through the modem; and a telephone communication monitoring server 53b for storing/managing the information about the transmitted data and information about the unlawful hardware reconfiguration transmitted from the internal computer 14, data storage in a portable storage media and data printing operation, by determining whether the data is transmitted and the tracing information is stored according to the security grade corresponding to the extracted destination.

Figure 6A:
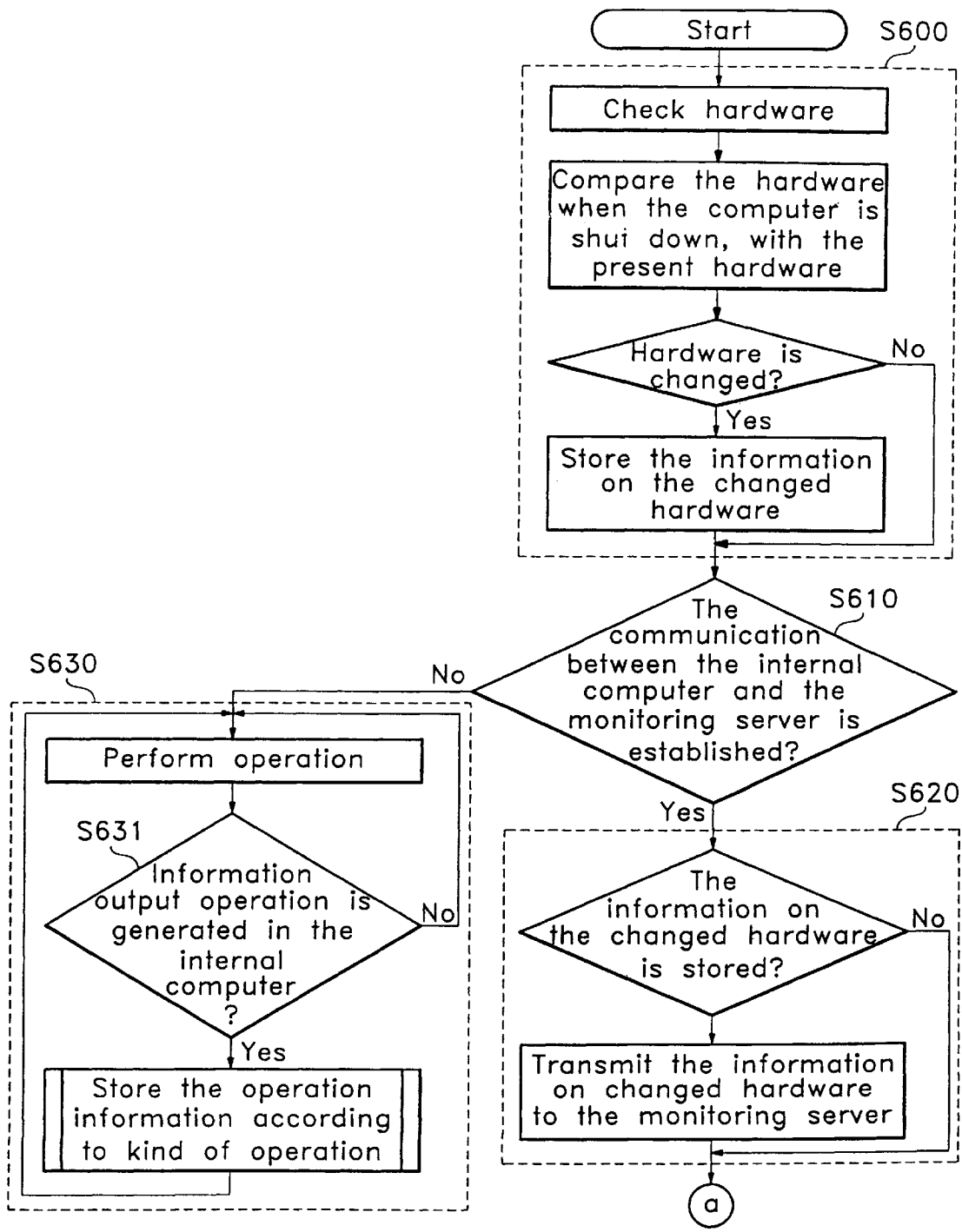
FIGS. 6A to 6C are flowcharts illustrating information security methods for tracing the information outflow, in accordance with the present invention.
Figure 6B:
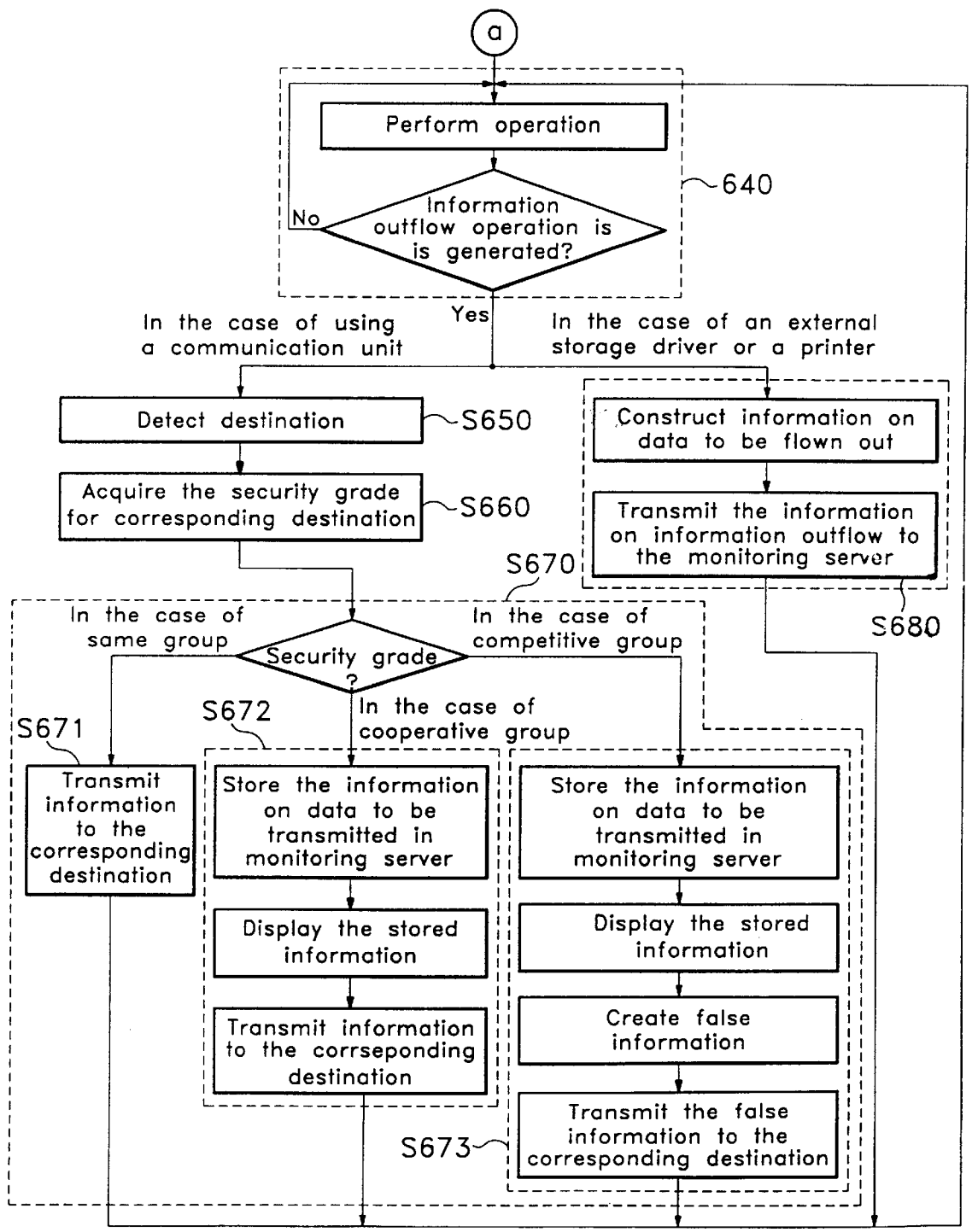
Figure 6C:
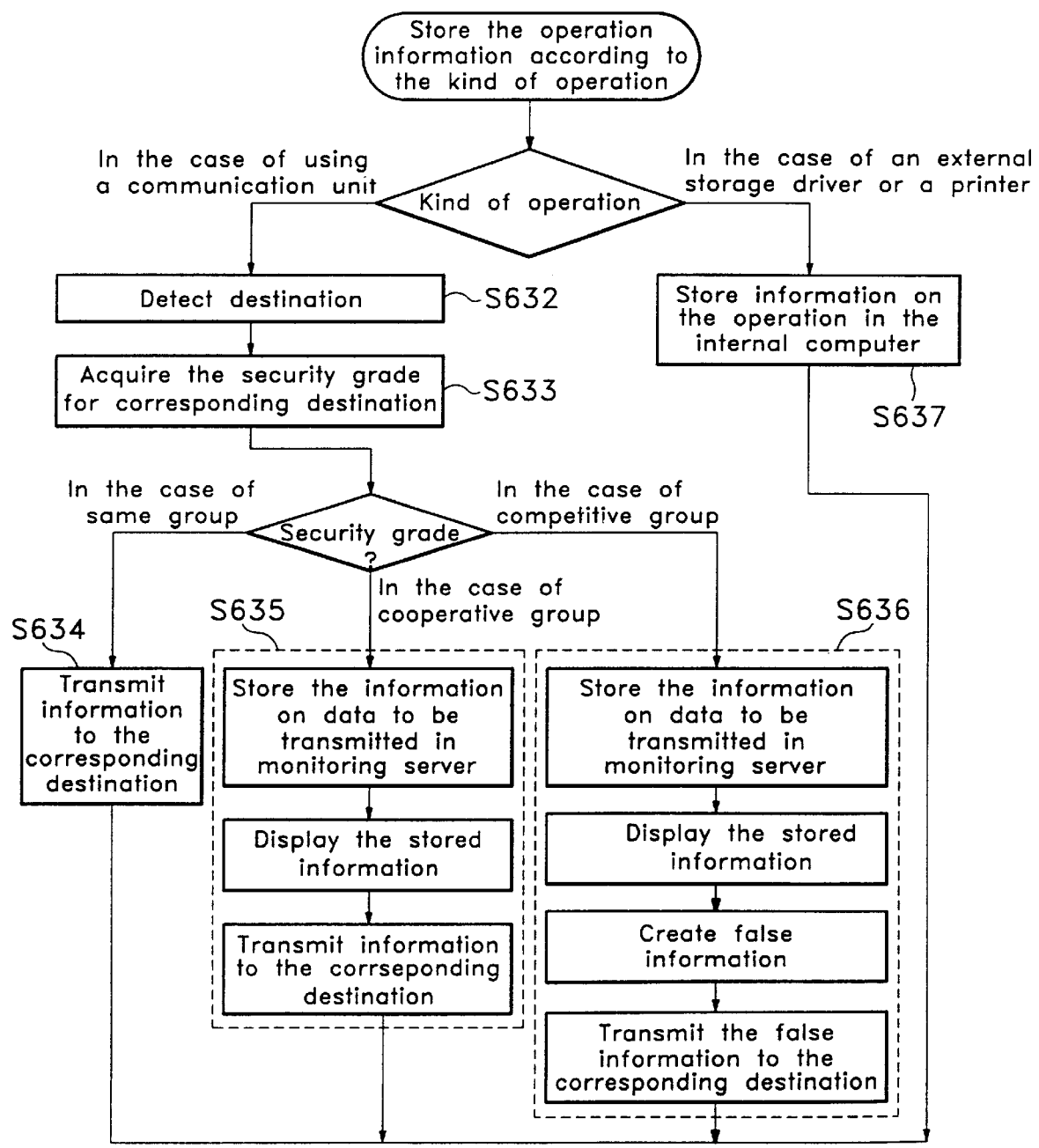

FIGS. 6A to 6C are flowcharts illustrating the method for tracing the information outflow according to the present invention.

As illustrated in the drawings, the method includes the steps of: storing the information about the changed hardware by sensing the change of the hardware in the internal computer (Step: S600); determining whether the communication between the internal computer and the monitoring server is established (Step: S610); transmitting the information about the changed hardware to the monitoring server, when the communication between the internal computer and the monitoring server is established (Step: S620); storing the information about the output operation, when the communication between the internal computer and the monitoring server is not established and the information outflow from the internal computer is generated (Step: S630); determining whether the information outflow is generated from the internal computer, after the changed information is transmitted to the monitoring server (Step: S640); detecting the destination to which the data is transmitted, when the information outflow operation is performed by the communication unit (Step: S650); acquiring the security grade corresponding to the detected destination (Step: S660); transmitting the data according to the acquired security grade (Step: S670); and transmitting the information about the information outflow to the monitoring server, when the information outflow operation is performed by means of a predetermined external output unit (Step: S680).

Here, the step (S630) of storing the information about the output operation includes the steps of: determining whether the information output operation is generated in the internal computer (Step: S631); detecting the destination to which the data is transmitted, when the information output operation is performed by means of the modem (Step: S632); acquiring the security grade corresponding to the detected destination (Step: S633); transmitting the data to be transmitted to the corresponding destination, when the acquired security grade is the same group (Step: S634); transmitting the data to the corresponding destination after storing/displaying a predetermined information about the data to be transmitted in/on the monitoring server, when the acquired security grade is the cooperative group (Step: S635); transmitting the false information to the corresponding destination after storing/displaying a predetermined information about the data to be transmitted in/on the monitoring server, when the acquired security grade is the competitive group (Step: S636); and storing the information about the information output operation in the internal computer, when the information output operation is performed by means of the predetermined external output unit (Step: S637).

The step (Step: S670) of transmitting the data according to the acquired security grade, includes the steps of: transmitting the data to be transmitted to the corresponding destination, when the acquired security grade is the same group (Step: S671); transmitting the data to the corresponding destination after storing/displaying the predetermined information about the data to be transmitted in/on the monitoring server, when the acquired security grade is the cooperative group (Step: S672); and transmitting the false information to the corresponding destination after storing/displaying the predetermined information about the data to be transmitted in/on the monitoring server, when the acquired security grade is the competitive group (Step: S673).

The operation of the information security system for tracing the information outflow according to the prevent invention will be explained, with reference to the drawings.

First, the change of the hardware in the internal computer is sensed, and the information about the changed hardware is stored (Step: S600).

Generally, the information about the hardware is checked when the internal computer 14 is booting, and the information about the hardware is stored in a nonvolatile memory when the computer is shut down. Accordingly, by comparing the information, it can be determined whether the hardware is changed or not.

After storing the information about the changed hardware by sensing the change of the hardware of the internal computer 14, it is determined whether the communication between the internal computer 14 and the monitoring server is established (Step: S610).

At this time, in the case that the internal communication system 31 is connected to the Internet, the monitoring server is the packet communication monitoring server 42. In the case that the internal communication system 31 is connected to the PSTN 54, the monitoring server is the telephone communication monitoring server 53b. The packet communication monitoring server 42 and the telephone communication monitoring server 53b are described separately, when they have their respective functional characteristics. However, both of them are described as the monitoring server, when explaining the general function of server.

As a result of the determination as to whether the communication is established between the internal computer 14 and the monitoring server, in the case that the communication between the internal computer and the monitoring server is established by means of a local area network LAN, the information about the changed hardware stored in the internal computer is transmitted to the monitoring server (Step: S620).

As a result of the determination as to whether the communication is established between the internal computer 14 and the monitoring server, in the case that the communication is not established and the information outflow operation is generated in the internal computer 14, the information about the generated output operation is stored (Step: S630).

The process for storing the information about the output operation will be explained in detail. First, it is determined whether the information output operation is generated in the internal computer 14 (Step: S631).

As a result of the determination as to whether the information output operation is generated in the internal computer, when the information output operation is generated by means of the modem of the internal computer 14, the telephone communication monitoring server 53b detects the destination to which the data is transmitted by means of the switch 53a (Step: S632).

At this time, the method for looking for the destination to which the data is transmitted is omitted, as it is the conventional art in the switch of the PSTN.

After detecting the destination to which the data is transmitted, the telephone communication monitoring server 53b acquires the security grade corresponding to the detected destination according to the established standard. (Step: S633).

The security grade is classified into the same group A; the cooperative group B; and the competitive group C, according to the characteristic of the destination to which the data is transmitted, and they are registered and stored in the monitoring server.

After acquiring the security grade corresponding to the detected destination according to the established standard, the telephone communication monitoring server 53b transmits the data to be transmitted to the corresponding destination, when the acquired security grade is the same group A.

Figure 7A:
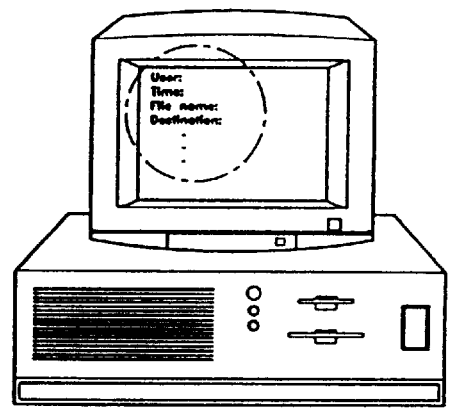
FIG. 7 is a view illustrating that the information related to the information outflow is displayed on a monitoring server.
Figure 7B:
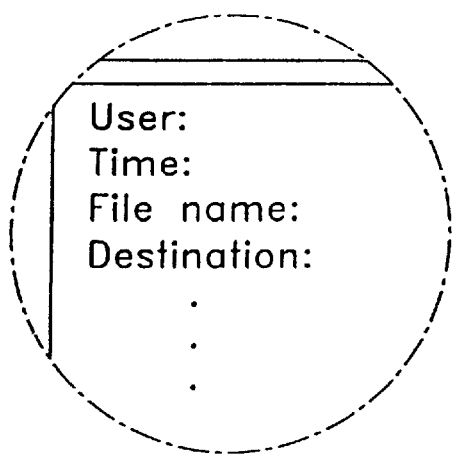

In the case that the acquired security grade is the cooperative group B, the telephone communication monitoring server 53b stores a predetermined information about the data to be transmitted. After that, as shown in FIG. 7, it displays the data to be transmitted and sends the data to the corresponding destination (Step: S635). At this time, the predetermined information includes an information outflow time, details about a person who flows out the information, a destination to which the data is transmitted and a name of file whose information is to be flown out.

When the acquired security grade is the competitive group C, the telephone communication monitoring server 53b stores the information about the data to be transmitted and displays the information. After that, as shown in FIG. 7, the false information is created and transmitted to the corresponding destination (Step: S636)

In the case that the information output operation is performed by means of the external output unit such as the printer or external storage drive, the information about the information output operation is stored in the internal computer 14 (Step: S637).

On the other hand, when the communication between the internal computer 14 and the monitoring server is established and the information about the changed hardware is stored in the internal computer 14, the information about the changed hardware is transmitted to the monitoring server and it is determined whether the information outflow operation is generated in the internal computer 14 (Step: S640).

As a result of the determination whether the information outflow operation is generated in the internal computer 14, when the information outflow operation is generated by means of the communication unit, the destination to which the data is transmitted is detected (Step: S650).

For example, in the case that the communication unit is a dedicate communication adapter for connecting Internet, the packet communication monitoring server 42 analyzes by means of the packet filtering gateway and can obtain the value of an IP (Internet Protocol) address.

After detecting the destination to which the data is transmitted, the packet communication monitoring server 42 acquires the security grade corresponding to the destination to which the detected data is transmitted according to the established information (Step: S660).

After acquiring the security grade regarding the destination to which the detected data is transmitted, the data is transmitted according to the acquired security grade (Step: S670).

In other words, when the acquired security grade is the same group A, the packet communication monitoring server 42 transmits the data to be transmitted to the corresponding destination (Step: S671).

In the case that the acquired security grade is the cooperative group B, the packet communication monitoring server 42 stores a predetermined information about the data to be transmitted. After that, it displays the information as shown in FIG. 7, and transmits the data to the corresponding destination (Step: S672).

When the acquired security grade is the competitive group C, the packet communication monitoring server 42 stores a predetermined information about the data to be transmitted and displays the information. After that, as shown in FIG. 7, the false information is created and transmitted to the corresponding destination (Step: S673).

To prevent the data to be transmitted from being transmitted to the competitive group C, the false information instead of the data to be transmitted is created. Moreover, the created false information is transmitted to the corresponding destination during the predetermined time period. The transmission can be used as an evidence of the data outflow, later.

On the other hand, as a result of determination whether the information outflow operation is generated in the internal computer 14, when the information outflow operation is performed by means of the external output unit such as the printer or the external storage drive, the information about the information outflow is transmitted to the monitoring server (Step: S680).

The operation of the monitoring server in the information security system for tracing the information outflow will be explained, as follows. First, on receiving the information about the information outflow from the internal computer 14, the monitoring server stores the received information for tracing the information outflow. At this time, the received information includes the time when the information is flown out, details about a person who flows out the information, the destination to which the data is transmitted, and the name of file whose information is to be flown out.

After storing the received information, the information is displayed to a security personnel, as shown in FIG. 7.

The security personnel can trace the information outflow through the stored information of the monitoring server. As the security information which is not transmitted to the monitoring server caused by the communication jamming is stored in the internal computer 14, the security personnel can trace the information outflow.

Moreover, as the operation described above is transparent to the user who uses the internal computer 14 and gives a burden to the unlawful user for the unlawful outflow of data, thereby preventing the unlawful outflow of the data which is intentionally planned.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An information security system for tracing information outflow, comprising:

an internal communication system which has internal computers for transmitting security information by tracing data through a communication equipment, outputting data to a predetermined external output means and connecting said internal computers to a predetermined external network; and a communication monitoring device which stores a predetermined information regarding the data to be transmitted by applying an established security policy according to a security grade of a destination to which the data is to be transmitted by said internal computers, said security grade being classified into a same group, a cooperative group, or a competitive group according to a characteristic of the destination;

wherein, said communication monitoring device, comprises:

a destination extracting means for extracting the destination from the data to be transmitted; and a communication monitoring server for storing and displaying said predetermined information about the data to be transmitted and determining whether the tracing information is stored according to said security grade for the extracted destination.

2. The information security system of claim 1, wherein said predetermined external network is a public switched telephone network (PSTN).

3. The information security system of claim 2, wherein said destination extracting means is a switch for connecting the internal computers to the (PSTN).

4. The information security system of claim 1, wherein said predetermined external network is an Internet.

5. The information security system of claim 4, wherein said destination extracting means is a packet filtering gateway for connecting said internal computers to said Internet.

6. The information security system of claim 1 wherein, according to said security policy, data is transmitted to the destination, when said security grade is classified in the same group; the predetermined information regarding the data to be transmitted is stored/displayed in/on said communication monitoring server, when said security grade is classified in the cooperative group; and the predetermined information regarding the data to be transmitted is stored/displayed in/on said communication monitoring server and false information is created and transmitted to the destination, when said security grade is classified in the competitive group.

7. The information security system of claim 1, wherein said predetermined information includes: a time when the information outflow occurred; details about a person who caused the outflow of the information; a destination to which the information is transmitted; and a name of a file containing the transmitted information.

8. The information security system of claim 1, wherein said predetermined external output means is an external storage means equipped with a portable storage medium.

9. The information security system of claim 8, wherein said external storage means is a floppy disk drive.

10. The information security system of claim 1, wherein said predetermined external output means is an output means which outputs data using a printable medium.

11. The information security system of claim 1, wherein said output means is a printer.

12. An information security method for tracing an information outflow in a security system having a monitoring server for connecting an internal computer in an internal network to an external network, comprising the steps of:

storing information about a changed hardware by sensing the change of a hardware of said internal computer;

transmitting the stored information about the changed hardware to said monitoring server when a communication is established between said internal computer and said monitoring server;

storing information about an output operation when a communication is not established between said internal computer and said monitoring server and the information outflow is generated from the internal computer;

determining whether an information outflow operation is generated in said internal computer, after transmitting the information about the changed hardware to said monitoring server;

detecting a destination to which data is transmitted, when the information outflow operation is performed by a communication means;

acquiring a security grade corresponding to the detected destination, said security grade being classified into a same group, a cooperative group, or a competitive group according to a characteristic of the destination;

transmitting data according to said acquired security grade; and transmitting data on the information outflow to said monitoring server, when the information outflow operation is performed by said communication means.

13. The method of claim 12, wherein said step of storing the output operation information comprises, the steps of:

determining whether the information output operation is generated from said internal computer;

detecting the destination to which the data is transmitted, when the information output operation is performed by a communication means;

acquiring said security grade corresponding to the detected destination;

transmitting the data to the destination to which the data is to be transmitted, when said acquired security grade is classified in the same group;

transmitting the data to the destination after storing/displaying the predetermined information about the data to be transmitted in/on said monitoring server, when said acquired security grade is classified in the cooperative group;

transmitting the data to the destination by creating false information after storing/displaying the predetermined information about the data to be transmitted in/on said monitoring server, when said acquired security grade is classified in the competitive group; and storing the information about the information output operation in said internal computer, when the information output operation is performed by said predetermined external output means.

14. The method of claim 13, wherein said communication means is a modem.

15. The method of claim 13, wherein said predetermined external output means is an external storage means equipped with a portable storage medium.

16. The method of claim 15, wherein said external storage means is a floppy disk drive.

17. The method of claim 13, wherein said predetermined external output means is an output means which outputs data using a printable medium.

18. The method of claim 17, wherein said output means is a printer.

19. The method of claim 12, wherein said step of transmitting data comprises the steps of:

transmitting the data to the destination to which the data is transmitted, when said acquired security grade is classified in the same group;

transmitting the data to the destination after storing/displaying the predetermined information about the data to be transmitted in/on said monitoring server, when said acquired security grade is classified in the cooperative group; and transmitting the data to the destination by creating false information after storing/displaying the predetermined information about the data to be transmitted in/on said monitoring server, when said acquired security grade is classified in the competitive group.

20. The method of claim 13 or claim 19, wherein said predetermined information includes: a time when the information outflow occurred; details about a person who caused the outflow of the information; a destination to which the information is transmitted; and a name of a file containing the transmitted information.

* * * * *